(12) United States Patent
Liu (10) Patent No.: US 12,141,300 B2
(45) Date of Patent: Nov. 12, 2024

(54) RETAINING DEVICE IDENTITIES AFTER FIRMWARE UPDATES

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 346 days.

(21) Appl. No.: 17/668,721

(22) Filed: Feb. 10, 2022

(65) Prior Publication Data

US 2023/0254162 A1 Aug. 10, 2023

(51) Int. Cl.
*G06F 21/62* (2013.01)
*H04L 9/08* (2006.01)
*H04L 9/32* (2006.01)

(52) U.S. Cl.
CPC ............ *G06F 21/62* (2013.01); *H04L 9/0841* (2013.01); *H04L 9/0866* (2013.01); *H04L 9/3268* (2013.01)

(58) Field of Classification Search
CPC ........................................................ G06F 21/62
See application file for complete search history.

(56) References Cited

U.S. PATENT DOCUMENTS

| | | | |
|---|---|---|---|
| 2006/0174242 A1* | 8/2006 | Zhu | G06F 8/65 717/172 |
| 2013/0125107 A1* | 5/2013 | Bandakka | H04L 67/10 717/171 |
| 2018/0336024 A1* | 11/2018 | Klische | G06F 8/65 |
| 2020/0351082 A1* | 11/2020 | Wan | H04L 9/3247 |

* cited by examiner

*Primary Examiner* — Bradley W Holder
(74) *Attorney, Agent, or Firm* — Greenberg Traurig (57) ABSTRACT

In some aspects, the techniques described herein relate to a system including a key management server (KMS) configured to generate a first unique device secret (UDS) based on a server private key stored by the KMS; and a secure device configured to: generate a second UDS based on a device private key stored by the secure device, the second UDS equal to the first UDS; compute a TCB component identifier (TCI) based on a received TCB; generate a first cryptographic key using the TCI and the second UDS; generate a first digital certificate including the first cryptographic key; transmit the first digital certificate to the KMS which validates the first digital certificate based on a second cryptographic key generated using the first UDS; receive a second digital certificate from the KMS which is signed using a second server private key; and store the second digital certificate as a device certificate.

20 Claims, 8 Drawing Sheets

RETAINING DEVICE IDENTITIES AFTER FIRMWARE UPDATES

FIELD OF THE TECHNOLOGY

At least some embodiments disclosed herein relate generally to semiconductor devices and, in particular, to managing the identity of secure semiconductor devices.

BACKGROUND

Device identity is a fundamental aspect of ensuring security in computing devices. In such devices, identity validates that software has not been tampered with and can be trusted. Currently, approaches generate identity by measuring and verifying software images. However, when updates are applied, the identity necessarily changes.

DETAILED DESCRIPTION

In a DICE system, a secure device includes multiple layers. A first layer (Layer 0) comprises the first mutable code above the hardware (or DICE) layer of the secure device. Subsequent layers (Layer 1, Layer 2, etc.) add additional functionality beyond the previous layer(s). In a DICE system, each layer has an identity represented as a cryptography key (either symmetric or asymmetric). Further, each key is generated based on a computation performed by a previous layer on the current layer. Thus, a Layer 0 key is generated by the DICE layer performing a computation on Layer 0. In general, this computation will involve measuring the software or firmware of Layer 0 and then generating a compound device identifier (CDI) using the measurement (and other data). Layer 0 will then generate its keys using the CDI value provided by the DICE layer. This process is repeated each boot. As such, if the software in Layer 0 is changed, the keys generated will differ. Generally, a key management system (KMS) will store the public keys of a secure device before being released to manufacturing. Thus, the KMS can ensure that a given secure device's identity is valid. However, if the secure device's firmware is updated, the public key stored by KMS will not match the new public key computed by the DICE architecture. The example embodiments address this and other problems arising from DICE key generation procedures used in secure devices.

In a first embodiment, a KMS and secure device use a shared unique device secret (UDS) value generated via, for example, a Diffie-Hellman key exchange protocol. Since the KMS and secure device both share the UDS, the two devices can independently derive Layer 0 device keys. Thus, when a firmware provides a firmware update to both the KMS and secure device, the secure device can install the firmware and provisionally generate a self-signed certificate that includes the proposed new key. The KMS can validate this self-signed certificate using its own version of the device public key and then issue a new certificate certifying the device key generated by the secure device.

In another embodiment, a secure device is equipped with a device key generated using a physically unclonable function (PUF). This device key is used as an embedded certificate authority to sign a certificate for the device key of Layer 0. During a firmware update, a secure command is issued, which can be validated with a manufacturer's public key, and a measurement of the firmware is provided, which is securely written in a write-protected region. When the device reboots, a new measurement is computed and compared to the stored measurement. If these measurements match, the secure device proceeds to generate a new identity key and certificate signed with the device key.

Figure 1:
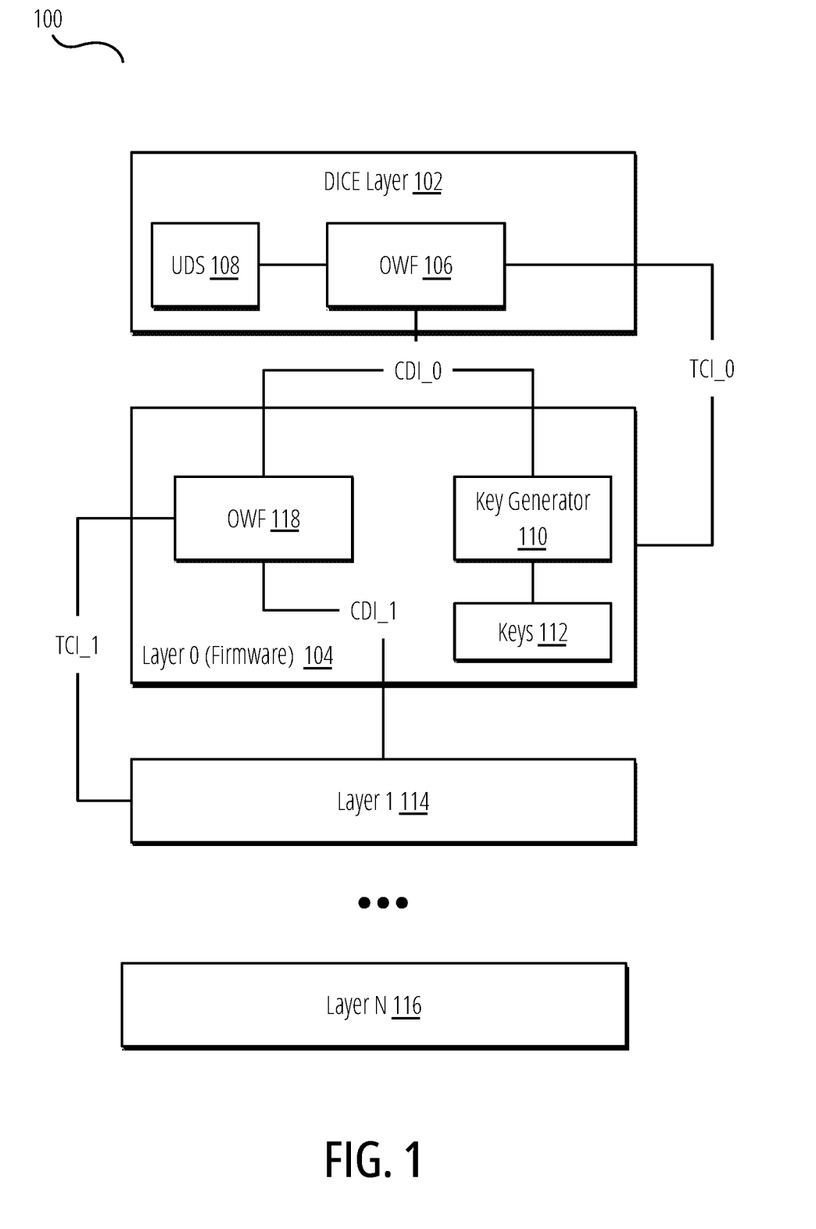
FIG. 1 is a block diagram of a Device Identity Composition Engine (DICE) system according to some of the example embodiments.

FIG. 1 is a block diagram of a DICE system according to some of the example embodiments.

In an embodiment, a system 100 includes a plurality of layers. The layering architecture based on DICE considers the execution states that are entered progressing from a base hardware layer (i.e., DICE layer 102). The base hardware layer is assumed to be in a trustworthy state before transitioning to Layer 0 104. Layer 0 104 is assumed to be in a trustworthy state before transitioning to Layer 1 114, and so on. Transitioning between layers of a DICE layering architecture involves creating a CDI value and securely passing it to the next layer. While the foregoing description describes only a few layers, any number of layers may be implemented.

In an embodiment, the DICE layer 102 includes UDS 108 and a one-way function (OWF 106). In an embodiment, the UDS 108 can comprise any unique value that is associated with the system 100. In some embodiments, the UDS 108 is a statistically unique, device-specific, secret value. The UDS 108 may be generated externally and installed during manufacture and/or generated internally during device provisioning. The UDS 108 may be stored in non-volatile memory on the device (e.g., eFuses) or any other suitably protected area to which the system 100 can restrict access. In some embodiments, the UDS 108 can be generated using a physically unclonable function (PUF). In some embodiments, the OWF 106 can comprise any cryptographic pseudorandom function (PRF). In an embodiment, the OWF 106 accepts seed and data values. In an embodiment, the seed value in DICE layer 102 can comprise the UDS 108 while the data value can comprise a trusted computing base (TCB) component identifier (TCI) of the next layer (e.g., TCI_0, as illustrated). In an embodiment, the OWF 106 can comprise an HMAC function using the UDS 108 as the HMAC key and TCI_0 as the message. In higher layers, the seed value can comprise the component device identifier (CDI) value received from the previous layer, as will be discussed. In other embodiments, the OWF can comprise a hash function (e.g., SHA-256) that can concatenate the UDS and TCI_0 as the message.

In an embodiment, the DICE layer 102 measures Layer 0 104 to compute a TCI for Layer 0. For example, the TCI can include a hash computed over runtime code that executes in shielded locations of Layer 0. Other suitably unique properties of Layer 0 can be used in lieu of or in addition to hashing the image of Layer 0. The DICE layer 102 then inputs the TCI_0 and UDS 108 values into the OWF 106 to generate a CDI value for Layer 0 104 (CDI_0).

As illustrated, the DICE layer 102 provides the computed CDI_0 value to Layer 0 104. In Layer 0 104, the CDI_0 value is used by OWF 118 to compute the CDI of the next layer (Layer 1 114). Similar to OWF 106, the OWF 118 uses the measured TCI of Layer 1 114 (TCI_1) and the received CDI (CDI_0) to compute the next CDI value (CDI_1). In an embodiment, Layer 1 104 also includes a key generator 110 that generates keys 112 using the CDI_0 value. In an embodiment, the key generator 110 can comprise an asymmetric key generator, and keys 112 can comprise asymmetric keys. In other embodiments, the key generator 110 can comprise a symmetric key generator, and keys 112 can comprise symmetric keys. If key generator 110 comprises a symmetric key generator, the key generator 110 may also use the TCI value of the current layer when generating keys. As illustrated, the processes performed by Layer 0 104 can be repeated at Layer 1 114 and to Layer N 116.

As illustrated, the CDI value used at each layer is dependent on the computed TCI of the layer. Thus, when the software or firmware of a given layer changes, the CDI value necessarily changes due to the use of an OWF. Since the CDI value changes, it follows that the resulting keys generated at a layer will change. Further, all downstream layers will change accordingly. Since Layer 0 104 is generally responsible for managing the device-level keys (i.e., the device identity), any update to Layer 0 firmware or software effectively changes the identity of a device.

Figure 2:
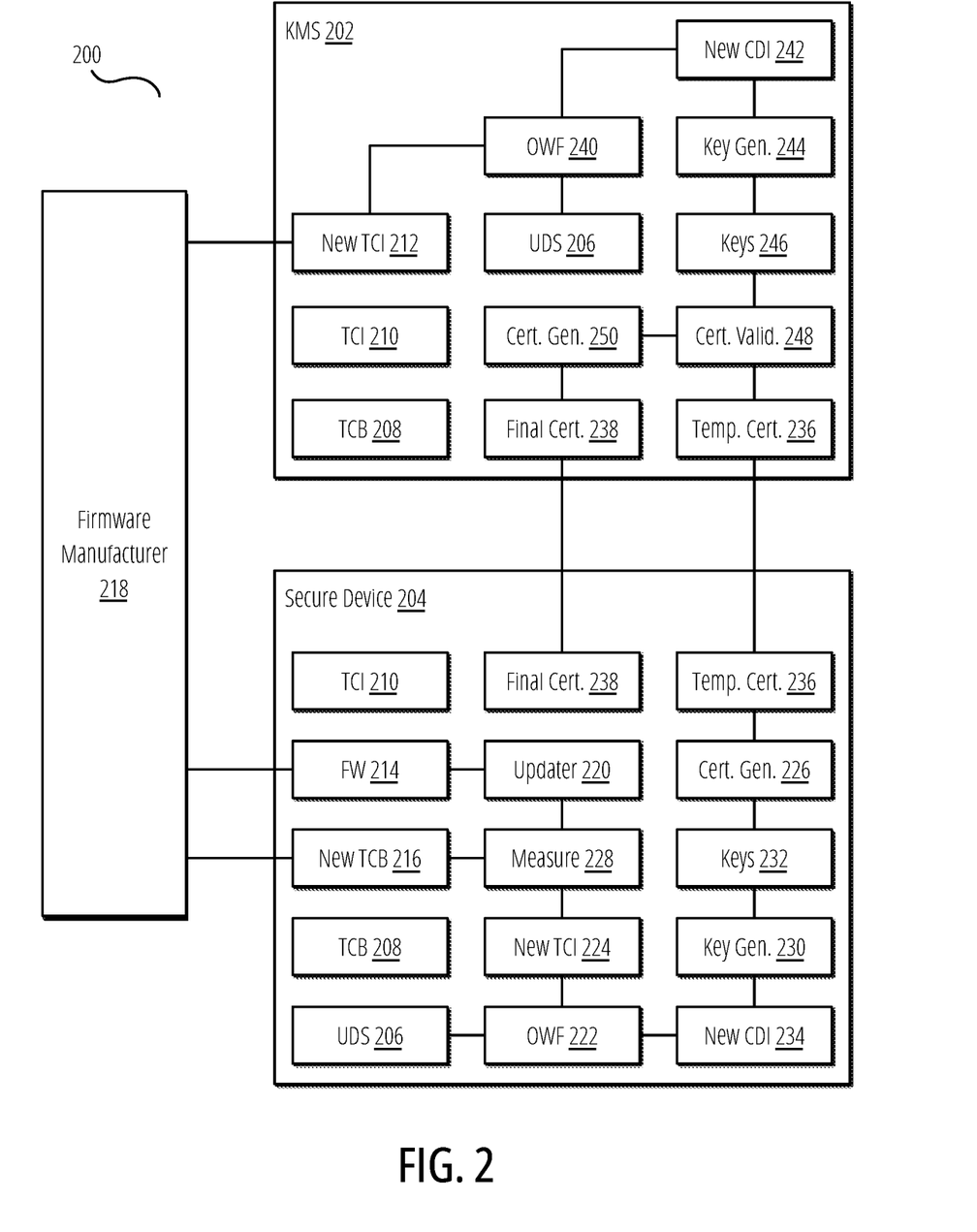
FIG. 2 is a block diagram of a system for updating the firmware of a DICE device according to some of the example embodiments.

FIG. 2 is a block diagram of a system for updating the firmware of a DICE device according to some of the example embodiments.

In an embodiment, system 200 includes a key management server (KMS 202) and a secure device 204. In an embodiment, the KMS 202 can comprise a computing device such as a server or a plurality of computing devices. In some embodiments, the KMS 202 can be deployed on cloud infrastructure and can comprise virtual computing devices such as virtual machines or containers. In an embodiment, the secure device 204 comprises a device implementing the DICE protocol (as illustrated in FIG. 1). In an embodiment, the secure device 204 and KMS 202 can communicate over a network (not illustrated) such as the Internet. In some embodiments, as described in more detail below, the KMS 202 can operate as an external certificate authority (ECA). In some embodiments, the KMS 202 can be owned or operated by the manufacturer of the secure device 204.

In an embodiment, the KMS 202 and the secure device 204 store the same UDS 206. That is, the UDS 206 is known to both the KMS 202 and the secure device 204. Various techniques can be used to ensure that the KMS 202 and secure device 204 both have access to the same UDS 206. For example, while being manufactured, the secure device 204 can report its UDS to the KMS 202 prior to being released from manufacturing. In some embodiments, the UDS on the secure device 204 can be secured from reading prior to release. In another embodiment, a Diffie-Hellman (DH) key exchange can be used to generate the UDS 206. That is, in some embodiments, the secure device 204 can include a public-private key pair, and the KMS 202 can include its own public-private key pair. The UDS 206 can be computed using the device private key and the server public key (e.g., by the secure device 204). Alternatively, an equal UDS 206 can be computed using the KMS private key and secure device public key (e.g., by the KMS 202). Details of obtaining a secret value (i.e., the UDS) using a DH key are not provided herein, and any standard DH implementation may be used.

As illustrated, both the KMS 202 and secure device store a current firmware trusted computing base (TCB) for Layer 0 of a DICE architecture, illustrated as TCB 208. As discussed, TCB 208 can comprise a TCB of a Layer 0 firmware image or layer of a DICE device (e.g., secure device 204). Similarly, both KMS 202 and secure device 204 can store the TCI 210 value computed by measuring TCB 208. Details of this measurement are described in FIG. 1. Given that KMS 202 also includes the TCI 210 and UDS 206, KMS 202 (and secure device 204) can compute the CDI for the Layer 0 firmware corresponding to TCB 208 and thus can also compute DICE and Alias keys for Layer 0.

In an embodiment, system 100 includes a firmware manufacturer 218. The firmware manufacturer 218 can comprise any computing device capable of transmitting firmware updates. As illustrated, the firmware manufacturer 218 can generate a firmware image 214 and transmit the firmware image 214 to the secure device 204 (e.g., via an over-the-air update or another type of update process, not limited herein). The firmware manufacturer 218 also provides a new TCB 216 to the secure device 204. In some embodiments, the new TCB 216 and firmware manufacturer 218 can be the same. In an embodiment, the new TCB 216 can comprise the firmware image 214 and any additional data necessary to complete the TCB. In an embodiment, the firmware manufacturer 218 also provides a new TCI 212 to the KMS 202. In an embodiment, the new TCI 212 corresponds to the firmware image 214 and the new TCB 216 stored locally on the secure device 204. In an alternative embodiment, firmware manufacturer 218 may transmit the new TCB 216 to the KMS 202, and the KMS 202 can compute the new TCI 212 from the new TCB 216.

In response to receiving the firmware image 214, secure device 204 initiates an updater 220 to update the Layer 0 firmware with the new firmware image 214. Details of updating firmware are not included for the sake of clarity. Once the update finishes, a measurement component 228 reads the new TCB 216 and can compute a new TCI 224.

Once secure device 204 computes the new TCI 224, the secure device 204 then computes a new CDI 234 using the new TCI 224 and UDS 206 (via OWF 222). Details of generating a CDI value are described in FIG. 1 and not repeated herein. The new CDI 234 is then used by key generator 230 to generate new keys 232 (e.g., DICE keys, such as device and alias keys), as described more fully in FIG. 1.

The secure device 204 includes a certificate generator 226 that receives the new TCI 224 and generates a temporary digital certificate 236 (e.g., X.509 certificate) for the device. In some embodiments, the certificate generator 226 generates a self-signed temporary digital certificate using the new keys 232. In some embodiments, the certificate generator 226 can include an identification of the layer (e.g., Layer 0) and a unique identifier (UID) as the common name (CN) field of the digital certificate. Other data can be included in the CN, such as personal information of the owner, an organization name, International Mobile Equipment Identity (IMEI) number, Internet Protocol (IP) address, Media Access Control (MAC) address, etc. In an embodiment, the certificate generator 226 can self-sign the digital certificate using the device or alias key included in the new keys 232. In an embodiment, the secure device 204 can provide the temporary digital certificate 236 to the KMS 202. In response, the KMS 202 validates the temporary digital certificate 236 and issues a final certificate 238, as will be discussed next. Once secure device 204 receives the final certificate 238, in some embodiments, the secure device 204 can complete the firmware update process by replacing TCI 210 stored on the secure device 204 with replacing TCB 208 stored on the secure device 204 with new TCB 216.

As discussed, the KMS 202 receives the temporary digital certificate 236 from the secure device 204. In response, a certificate validator 248 can validate the temporary digital certificate 236. Specifically, in an embodiment, the KMS 202 can include its own OWF 240 (e.g., hash or HMAC) that can be used to independently generate a new CDI 242. In an embodiment, the new CDI 242 generated by the KMS 202 and the new CDI 234 generated by the secure device 204 should be identical given the shared UDS 206. Furthermore, the KMS 202 receives the new TCI 212 directly from the firmware manufacturer 218 and can thus ensure its integrity. The new CDI 242 is then used by key generator 244 to generate new keys 246 (e.g., device and alias keys), as described more fully in FIG. 1. Since the UDS 206 and new CDI 242 are the same as those used by secure device 204, the keys 246 should be identical to new keys 232 on the secure device 204.

The KMS 202 uses the new keys 246 to validate the temporary digital certificate 236 via certificate validator 248. Specifically, the certificate validator 248 can use the public device or alias key to validate the digital signature included in the digital certificate. In some embodiments, the certificate validator 248 can further confirm that the properties of the digital certificate match the expected values. For example, certificate validator 248 can confirm the CN value, expiration date/time, etc., of the temporary digital certificate 236. In some embodiments, certificate validator 248 can also extract a public key from the temporary digital certificate 236 and compare the public key to one of the public keys in new keys 246 to confirm the keys match. For example, if the device key is included in the temporary digital certificate 236, the certificate validator 248 can compare the device key generated in new keys 246 with the public key in the certificate to validate that the keys agree.

In some embodiments, if the certificate validator 248 determines that the certificate is invalid or otherwise does not match what is expected, the KMS 202 can return an error code and/or message to the secure device 204. In some embodiments, the secure device 204 can roll back the firmware update in response to receiving an error code or message from the KMS 202.

Alternatively, if the certificate validator 248 validates the temporary digital certificate 236, the certificate validator 248 can signal to the certificate generator 250 to generate the final certificate 238 for the secure device 204. In some embodiments, the KMS 202 can act as an ECA for the secure device 204. As such, the KMS 202 can implement a CA functionality for Layer 0 certificates according to the DICE standard. Thus, in some embodiments, certificate generator 250 can generate a digital certificate for Layer 0 (or another layer) of the secure device 204 in response to confirm that the firmware updated on secure device 204 is valid. In some embodiments, the certificate generator 250 can include layer information (e.g., layer number, etc.) and a UID of the secure device 204 in the CN field of the digital certificate. In an embodiment, the KMS 202 can sign the final certificate 238 using its own authority private key. In some embodiments, the final certificate 238 comprises an IDevID certificate for Layer 0 according to the DICE standard.

In some embodiments, the KMS 202 can also revoke the old certificate current associated with the respective layer identified in the CN field (i.e., by updating a certificate revocation list, CRL). Finally, the KMS 202 can provide the final certificate 238 back to the secure device 204, and the secure device 204 can use the final certificate 238 as the Layer 0 certificate. While Layer 0 has been used in the foregoing examples, the above processes can be performed at any layer of the DICE layering architecture, and the use of Layer 0 is provided only as an example.

Figure 3:
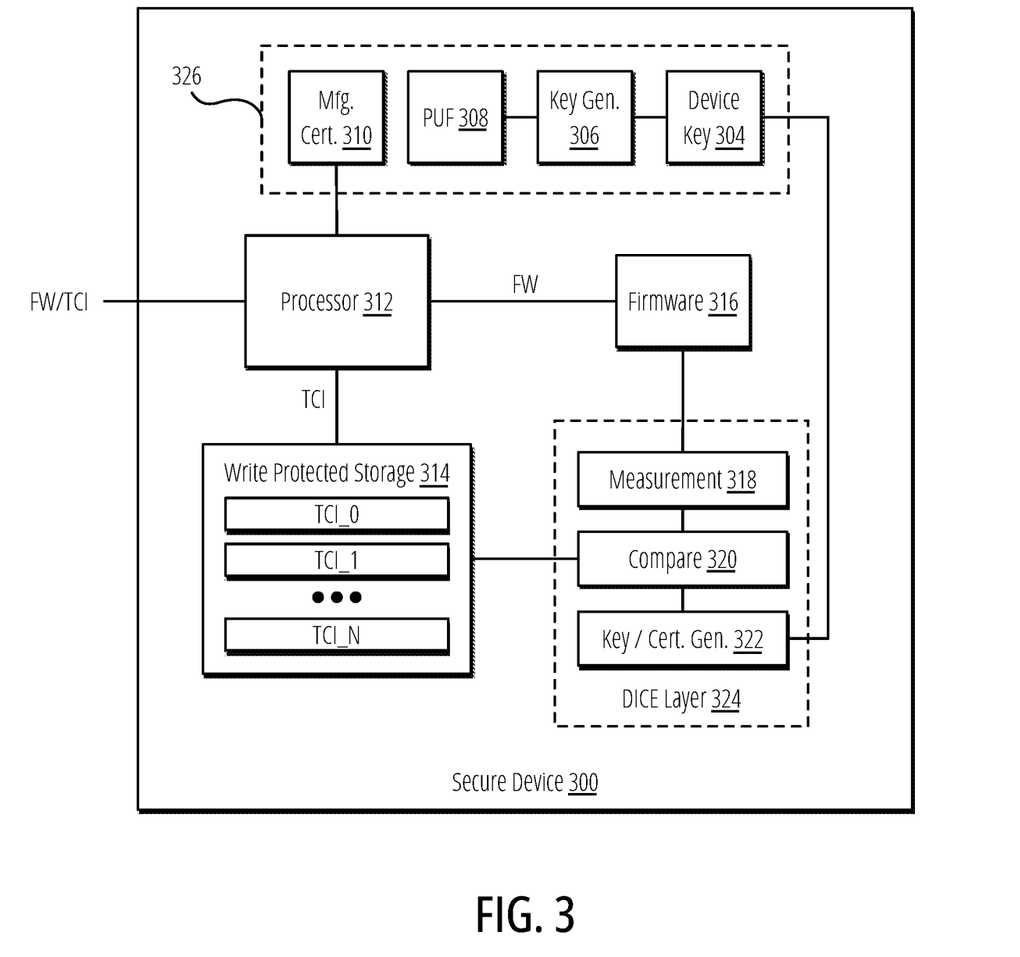
FIG. 3 is a block diagram of a secure device according to some of the example embodiments.

FIG. 3 is a block diagram of a secure device according to some of the example embodiments.

In an embodiment, a secure device 300 can comprise a computing device that implements DICE functionality. In some embodiments, the secure device 300 can comprise a memory device (e.g., a NAND Flash device), although the disclosure is not limited to specific uses of devices. In an embodiment, the secure device 300 includes a processor 312 capable of executing computer program instructions. For example, processor 312 can execute the computer program instructions included in firmware 316. Using DICE functionality, firmware 316 can be verified prior to execution, and the device can prevent executing malicious firmware.

In addition to executing arbitrary code, processor 312 can be configured to process secure commands. In some embodiments, a secure command comprises a command signed using a private key associated with a manufacturer of the secure device 300 or another entity. In the illustrated embodiment, a security component 326 includes various pre-installed security devices and cryptographic elements. Specifically, the security component 326 includes a PUF 308. In the illustrated embodiment, the PUF 308 may comprise a physical hardware circuit that exploits inherent randomness introduced during manufacturing to give a physical entity a unique 'fingerprint' or trust anchor. In the illustrated embodiment, the PUF 308 produces a consistent and repeatable value. In some embodiments, the PUF 308 may comprise a static random-access memory (SRAM) PUF, Delay PUF, or any other 308 technology implemented on the secure device 300.

In an embodiment, a key generator 306 can read the value generated by the PUF 308 and use the value to generate a device key 304 (e.g., as a seed or input value to the key generator 306). In an embodiment, the key generator 306 can comprise an asymmetric key generator, and the device key can comprise an asymmetric key pair. In an embodiment, the key generator 306 can comprise a symmetric key generator, and the device key 304 can comprise a symmetric key. The specific type of key is not limiting, and any well-known key algorithm can be used. As one example, the device key 304 can comprise an Elliptic Curve Digital Signature Algorithm (ECDSA) key pair.

In an embodiment, the security component 326 also includes a manufacturer's certificate 310. In an embodiment, the manufacturer's certificate 310 can comprise an X.509 certificate generated by a manufacturer during manufacturing of the secure device 300. In an embodiment, the manufacturer's certificate 310 is stored in a secure location and is tamper-proof. In an embodiment, the manufacturer's certificate 310 includes the manufacturer's public key (while the manufacturer securely stores the corresponding private key). In some embodiments, the manufacturer's certificate 310 is generated on a per-device basis (that is, the public key in the manufacturer's certificate 310 is unique to secure device 300). In other embodiments, the public key in the manufacturer's certificate 310 can be shared among multiple secure devices. In some embodiments, the manufacturer's certificate 310 can also store the device key 304, and thus the device key 304 can be certified by the manufacturer during production (and then made unreadable after being released from manufacturing). In some embodiments, the device key can be used as an embedded certificate authority to sign DICE keys generated by DICE layer 324 or other layers (e.g., Layer 0, Layer 1, etc.) in a DICE architecture. In an embodiment, the device key 304 is constant and never changes during the lifetime of the secure device 300. By contrast, DICE keys for a layer generated by, for example, key and certificate generator 322, change each time a TCI for the layer is changed (e.g., via software or firmware updates).

In an embodiment, the processor 312 is capable of receiving secure commands that are signed using the private key corresponding to the public key in the manufacturer's certificate 310. As such, processor 312 can validate that the command is properly signed prior to executing such commands. One such command can comprise a command to update the firmware 316 of the device. In such a command, the firmware image to update to and a computed TCI may be included, and the command may be signed. In response, processor 312 can validate the command by validating the signature using a server public key in the manufacturer's certificate 310. If the signature is valid, processor 312 can update firmware 316 with the new image. Further, processor 312 can write the new TCI to a corresponding location in write-protected storage area 314 via the secure command signed by the server private key. In an embodiment, the write-protected storage area 314 stores a list of TCI values for each DICE layer (TCI_0, TCI_1, etc.). In some embodiments, the write-protected storage area 314 can include both a current TCI value for a given layer and a previous TCI value for a given layer (to enable rollback). Details of TCIs are provided above and not repeated herein.

In an embodiment, after updating the firmware 316, the secure device 300 can reboot. During the reboot, DICE layer 324 is configured to calculate the TCI for the firmware (i.e., Layer 0) to generate keys and certificates for the firmware. During this process, measurement code 318 calculates a live TCI for the currently installed firmware 316 (i.e., the updated firmware). The measurement code 318 transmits this live TCI to comparator code 320. The comparator code 320 can comprise privileged code that can access the write-protected storage area 314 to load a corresponding TCI that was written by the processor 312 in response to the secure command. If the live TCI computed by measurement code 318 is equal to the corresponding TCI securely written to write-protected storage area 314, DICE layer 324 can confirm the firmware update and forward the live TCI to key and certificate generator 322 to continue with key and certificate generation according to DICE standards (details of such a process are described previously and not repeated herein). As illustrated, in some embodiments, the device key 304 can be used to sign the DICE keys generated at 324.

Figure 4:
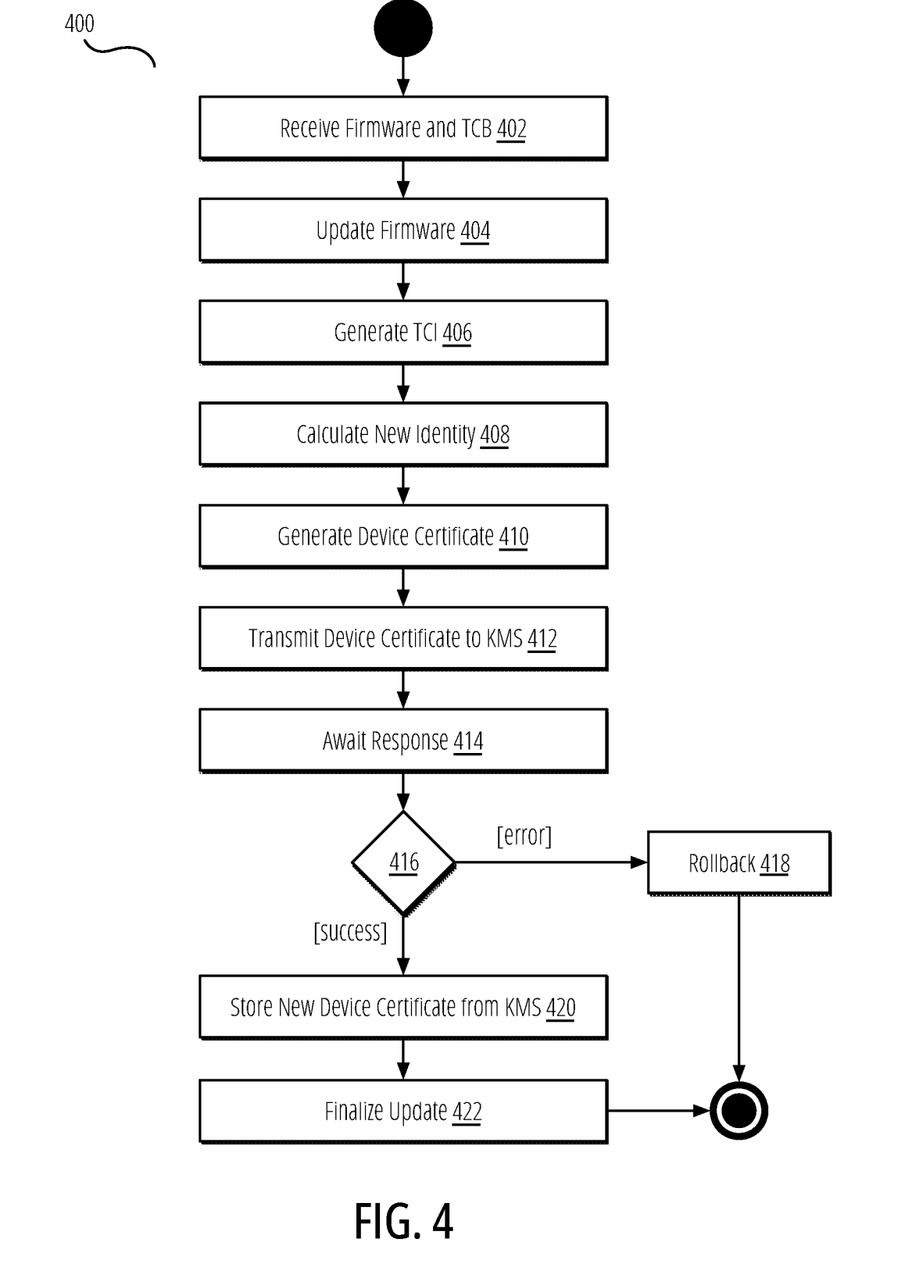
FIG. 4 is a flow diagram illustrating a method for updating a device certificate in a secure device according to some of the example embodiments.

FIG. 4 is a flow diagram illustrating a method for updating a device certificate in a secure device according to some of the example embodiments.

In step 402, method 400 can include receiving a firmware image and a TCB. In some embodiments, the firmware comprises Layer 0 code in a DICE architecture. The TCB can comprise a measurement (e.g., hash) of the firmware. In some embodiments, the TCB can comprise additional data relevant to the firmware, as described previously. In some embodiments, method 400 can receive the firmware and TCB directly from a firmware manufacturer, as illustrated in FIG. 2. In other embodiments, step 402 can include receiving the firmware image or TCB from a KMS.

In step 404, method 400 can include updating the firmware of the device executing method 400. In response to receiving the firmware image, method 400 can include initiating an updater process to update the Layer 0 firmware with the new firmware image. Details of updating firmware are not included for the sake of clarity.

In step 406, after updating the firmware, method 400 can include generating a new TCI for the firmware update. In an embodiment, step 406 can include reading the TCB received in step 402 and computing a new TCI using the provided TCB. Details of computing a TCI were provided previously and are not repeated herein.

In step 408, method 400 can include calculating a new identity. In an embodiment, a new identity refers to the computation of one or more keys. In some embodiments, these keys can comprise DICE keys (e.g., a device key and an alias key). In an embodiment, step 408 can include an interim step of computing a new CDI value using the TCI value computed in step 406 and a UDS. In some embodiments, the new CDI value can be computed using an OWF. Details of generating a CDI value are described in FIG. 1 and not repeated herein. In some embodiments, the CDI value can then be used to generate the one or more keys (either symmetric or asymmetric).

In step 410, method 400 can include using the new TCI to generate a temporary digital certificate (e.g., X.509 certificate) for a secure device. In some embodiments, step 410 can include generating a self-signed temporary digital certificate using the new keys generated in step 408. In some embodiments, step 410 can include an identification of the layer (e.g., Layer 0) and a UID as the CN field of the digital certificate. Other data can be included in the CN, such as personal information of the owner, an organization name, International Mobile Equipment Identity (IMEI) number, Internet Protocol (IP) address, Media Access Control (MAC) address, etc. In an embodiment, step 410 can include self-signing the digital certificate using the device or alias key generated in step 408.

In step 412, method 400 can include transmitting the device certificate generated in step 410 to a KMS. In some embodiments, step 412 can include transmitting the device certificate to the KMS over a network such as the Internet. In step 414, method 400 can include waiting for a response to the transmittal of the device certificate.

In step 416, method 400 receives a response to the transmittal of step 412 and determines if the response indicates a success or an error. In brief, a success means that the firmware and TCB received in step 402 are valid, and the secure device successfully generated a new identity in step 408. By contrast, an error indicates either the firmware or TCB was corrupted, or there was an error when generating the new identity. Details of generating a success or error status are provided in FIG. 5. In some embodiments, step 416 can include determining if a new device certificate was returned by the KMS and using the presence of a new device certificate as a success and the absence of a new device certificate as an error.

If an error was returned by the KMS, method 400 can include rolling back the firmware update in step 418. In an embodiment, step 418 can include reverting the firmware update and rolling back the firmware update to the version used prior to step 402. In some embodiments, step 418 can further include removing the TCI value generated in step 406, new identity generated in step 408, and temporary digital certificate generated in step 410. Further, in some embodiments, step 418 can include deleting the firmware and TCB received in step 402. In essence, step 418 can include reverting all operations occurring after step 402.

By contrast, if method 400 determines that a success code was returned in step 416, method 400 can include storing the new device certificate received from the KMS in step 420. In some embodiments, the new device certificate comprises an IDevID certificate for Layer 0 according to the DICE standard.

Finally, in step 422, method 400 can include finalizing the firmware update. In some embodiments, step 422 can include replacing an existing Layer 0 TCB and TCI with the TCB received in step 402 and the TCI generated in step 406, respectively.

Figure 5:
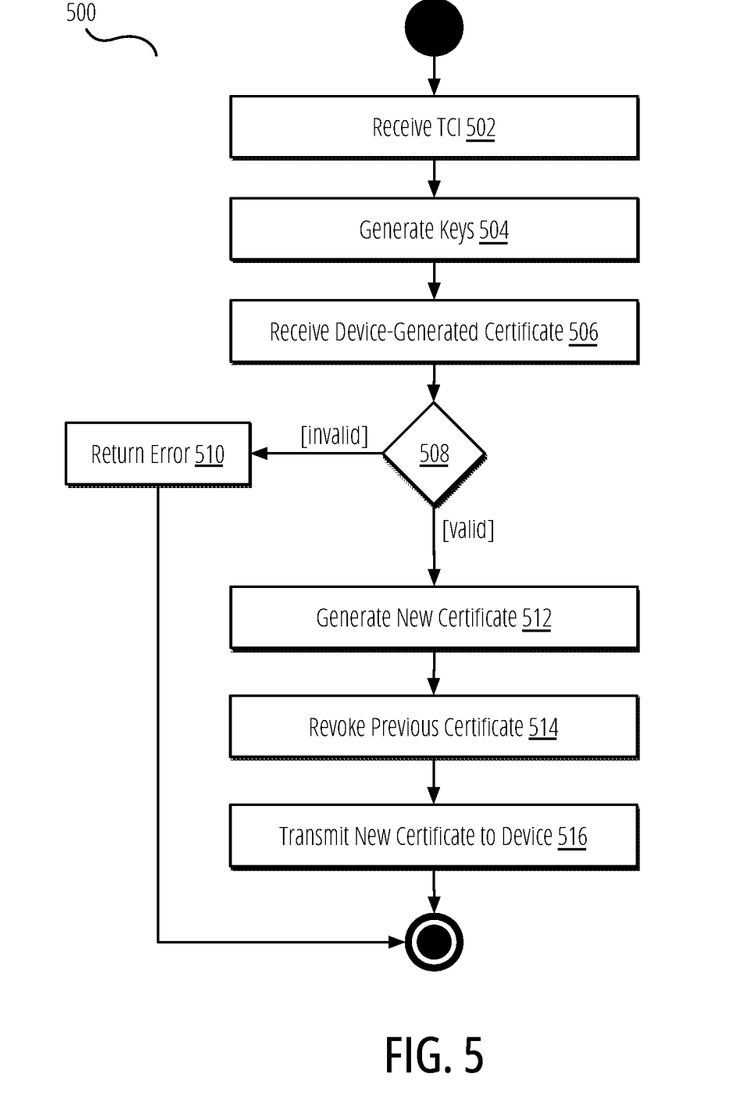
FIG. 5 is a flow diagram illustrating a method for validating a firmware update by a KMS according to some of the example embodiments.

FIG. 5 is a flow diagram illustrating a method for validating a firmware update by a KMS according to some of the example embodiments.

In step 502, method 500 can include receiving a TCI for a firmware layer. In some embodiments, the TCI can comprise a TCI computed by a manufacturer of a firmware layer and transmitted to a KMS implementing method 500.

In step 504, method 500 can include generating keys using the TCI received from a manufacturer. Specifically, in an embodiment, method 500 can include using an OWF (e.g., hash or HMAC) to independently generate a new CDI. Specifically, method 500 can use the TCI from step 502 and a UDS shared with a secure device (e.g., executing method 400) to generate the new CDI using the OWF. In step 504, method 500 can then use the new CDI to generate new keys 246 (e.g., device and alias keys), as described more fully in FIG. 1.

In step 506, method 500 can include receiving a device-generated certificate. In an embodiment, the received device-generated certificate corresponds to the self-signed certificate generated in step 410 of FIG. 4.

In step 508, method 500 can include validating the received device-generated certificate. In an embodiment, method 500 can use the public device or alias key generated in step 504 to validate the device-generated certificate. In some embodiments, method 500 can further confirm that the properties of the digital certificate match the expected values. For example, method 500 confirms the CN value, expiration date/time, etc., of the device-generated certificate. In some embodiments, method 500 can also extract a public key from the device-generated certificate and compare the public key to one of the public keys generated in step 504 to confirm the keys match. For example, if the device public key is included in the device-generated certificate, method 500 can compare the device key generated in step 504 with the public key in the device-generated certificate to validate that the keys agree.

If method 500 determines that the device-generated certificate is invalid, method 500 proceeds to step 510 and returns an error to the sender (i.e., a secure device). In some embodiments, the error can comprise an empty response. In other embodiments, the error can comprise (as one example) an error code (e.g., Hypertext Transport Protocol status code). However, if method 500 determines that the device-generated certificate is valid, method 500 proceeds to step 512.

In step 512, method 500 can include generating a new certificate for the secure device. In some embodiments, method 500 implement a CA functionality for Layer 0 certificates according to the DICE standard. Thus, in some embodiments, method can include generating a digital certificate for the Layer 0 (or another layer) of the secure device in response to confirm that the firmware updated on secure device is valid (i.e., the DICE key in the device-generated certificate is valid). In some embodiments, method 500 can include layer information (e.g., layer number, etc.) and a UID of the secure device in the CN field of the digital certificate. In an embodiment, method 500 can sign the new certificate using its own authority private key. In some embodiments, the new certificate can comprise an IDevID certificate for Layer 0 according to the DICE standard.

In step 514, method 500 can include revoking a previous certificate for the secure device. In some embodiments, step 514 can include revoking an old certificate current associated with the respective layer identified in the CN field of the new certificate (i.e., by updating a CRL).

In step 516, method 500 can include transmitting the new certificate to the secure device. In some embodiments, method 500 can transmit the new certificate as a response message to receiving the device-generated certificate, as described previously.

Figure 6:
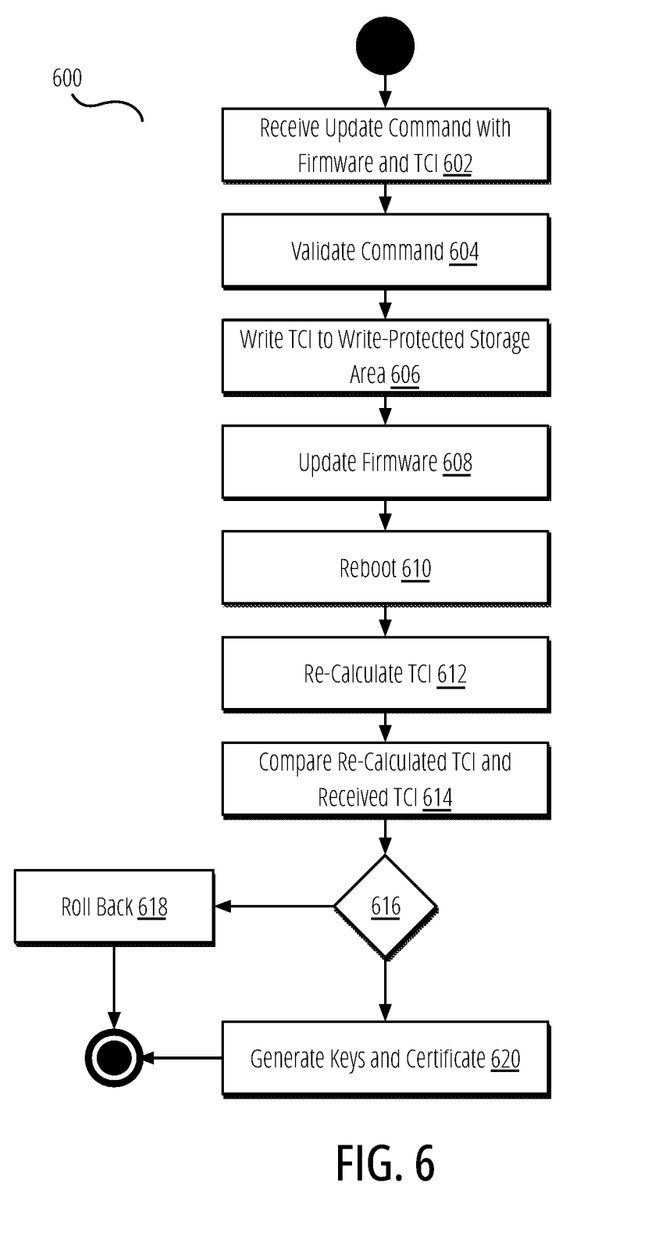
FIG. 6 is a flow diagram illustrating a method for validating a firmware update in a secure device according to some of the example embodiments.

FIG. 6 is a flow diagram illustrating a method for validating a firmware update in a secure device according to some of the example embodiments.

In step 602, method 600 can include receiving an update command that includes a firmware image and a TCI. In some embodiments, the update command can be signed using a private key of a manufacturer of the secure device executing method 600. In some embodiments, the secure device can securely store the public key corresponding to the private key used to sign the update command. In some embodiments, the public key can be stored in a manufacturer's certificate (e.g., X. 509 certificate).

In step 604, method 600 can include validating the command received in step 602. In an embodiment, step 604 can include validating the command by validating the signature using a key in the manufacturer's certificate.

In step 606, method 600 can include writing the TCI to a write-protected storage area. In an embodiment, the write-protected storage area can comprise any secure area that prevents manipulation or tampering with data. In an embodiment, the write-protected storage area stores a list of TCI values for each DICE layer (TCI_0, TCI_1, etc.). In some embodiments, the write-protected storage area can include both a current TCI value for a given layer and a previous TCI value for a given layer (to enable rollback). Details of TCIs are provided above and not repeated herein.

In step 608, method 600 can include updating the firmware using the firmware image received in step 602. In step 610, method 600 can include rebooting. In an embodiment, the secure device can replace an existing firmware image with the received image and upon completing writing, can reboot to perform DICE computations using the new firmware.

In step 612, method 600 can include re-calculating a TCI for the updated firmware image. In an embodiment, method 600 measures the current firmware (i.e., the updated firmware) to obtain a live TCI value.

In step 614, method 600 can include comparing the re-calculated TCI (in step 612) with the TCI stored in the write-protected storage (step 606). In an embodiment, method 600 can access the write-protected storage area to load a corresponding TCI that was written in step 606.

In step 616, method 600 determines if the two TCI values are equal. If not, method 600 proceeds to step 618. In an embodiment, step 618 can include reverting the firmware update and rolling back the firmware update to the version used prior to step 602. In some embodiments, step 618 can further include removing the TCI value written in step 606.

If, however, method 600 determines that the two TCI values are equal, method 600 can include generating keys and certificates in step 620. Details of generating keys and certificates using a DICE architecture are described previously and not repeated herein. In an embodiment, a PUF-based key can be used to sign the certificates, in contrast to keys generated using DICE. In this manner, a KMS can validate such certificates. Specifically, since the KMS can manage the PUF-based keys during manufacturing, it can store public keys corresponding to the PUF-based public keys used to sign certificates. Thus, even when the device identity changes, the KMS can still verify the identity of the device.

Figure 7:
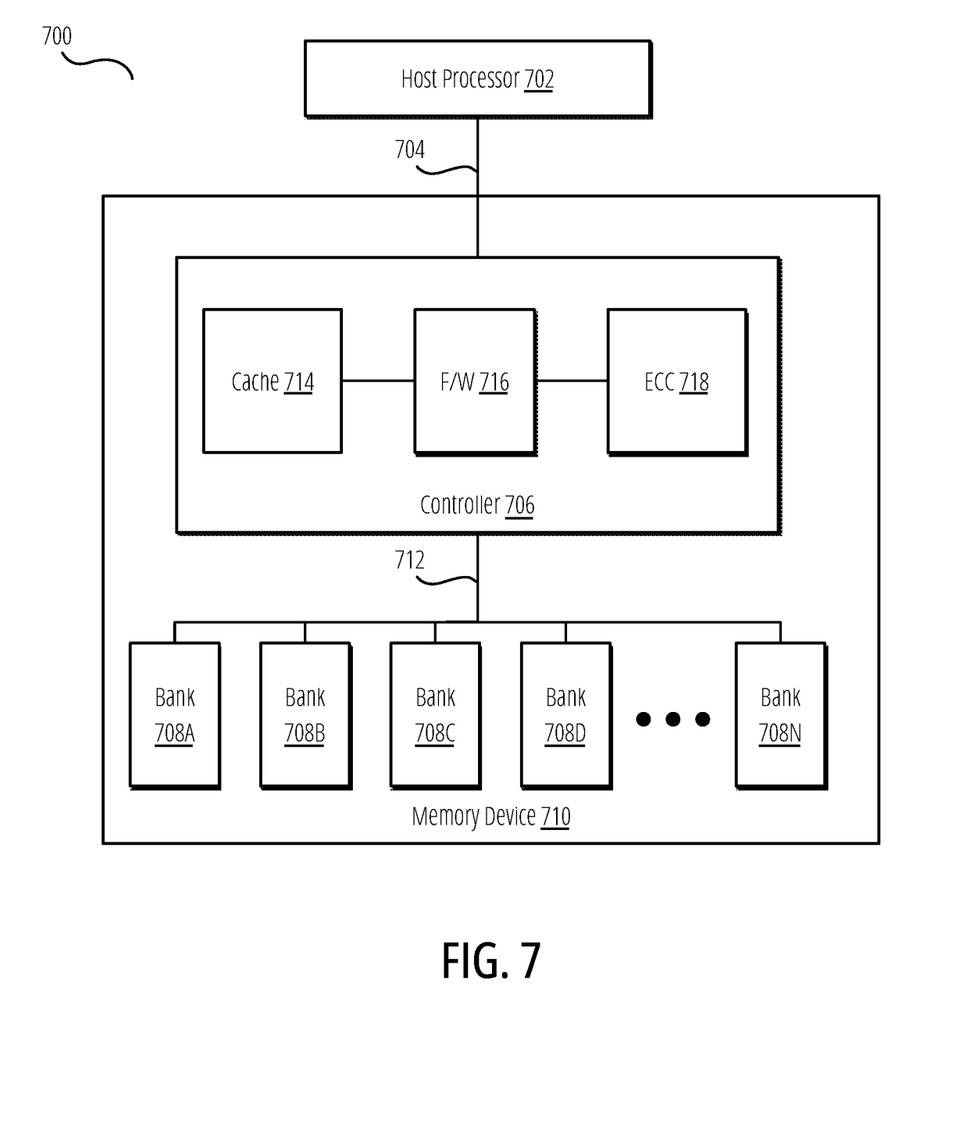
FIG. 7 is a block diagram illustrating a memory system according to some embodiments of the disclosure.

FIG. 7 is a block diagram illustrating a memory system according to some embodiments of the disclosure.

As illustrated, a computing system 700 includes a host processor 702 communicatively coupled to a memory device 710 via a bus 704. The memory device 710 comprises a controller 706 communicatively coupled to one or more memory banks (e.g., bank 708A, bank 708B, bank 708C, bank 708D, bank 708N, etc.), forming a memory array via an interface 712. As illustrated, the controller 706 includes a local cache 714, firmware 716, and an ECC module 718.

In the illustrated embodiment, host processor 702 can comprise any type of computer processor, such as a central processing unit (CPU), graphics processing unit (GPU), or other types of general-purpose or special-purpose computing devices. The host processor 702 includes one or more output ports that allow for the transmission of address, user, and control data between the host processor 702 and the memory device 710. In the illustrated embodiment, this communication is performed over the bus 704. In one embodiment, the bus 704 comprises an input/output (I/O) bus or a similar type of bus.

The memory device 710 is responsible for managing one or more memory banks (e.g., bank 708A, bank 708B, bank 708C, bank 708D, bank 708N, etc.). In one embodiment, the memory banks (e.g., bank 708A, bank 708B, bank 708C, bank 708D, bank 708N, etc.) comprise NAND Flash dies or other configurations of non-volatile memory. In one embodiment, the memory banks (e.g., bank 708A, bank 708B, bank 708C, bank 708D, bank 708N, etc.) comprise a memory array.

The memory banks (e.g., bank 708A, bank 708B, bank 708C, bank 708D, bank 708N, etc.) are managed by the controller 706. In some embodiments, the controller 706 comprises a computing device configured to mediate access to and from banks (e.g., bank 708A, bank 708B, bank 708C, bank 708D, bank 708N, etc.). In one embodiment, the controller 706 comprises an ASIC or other circuitry installed on a printed circuit board housing the memory banks (e.g., bank 708A, bank 708B, bank 708C, bank 708D, bank 708N, etc.). In some embodiments, the controller 706 may be physically separate from the memory banks (e.g., bank 708A, bank 708B, bank 708C, bank 708D, bank 708N, etc.). The controller 706 communicates with the memory banks (e.g., bank 708A, bank 708B, bank 708C, bank 708D, bank 708N, etc.) over the interface 712. In some embodiments, this interface 712 comprises a physically wired (e.g., traced) interface. In other embodiments, the interface 712 comprises a standard bus for communicating with memory banks (e.g., bank 708A, bank 708B, bank 708C, bank 708D, bank 708N, etc.).

The controller 706 comprises various modules including local cache 714, firmware 716 and ECC module 718. In one embodiment, the various modules (e.g., local cache 714, firmware 716 and ECC module 718) comprise various physically distinct modules or circuits. In other embodiments, the modules (e.g., local cache 714, firmware 716 and ECC module 718) may completely (or partially) be implemented in software or firmware.

As illustrated, firmware 716 comprises the core of the controller and manages all operations of the controller 706. The firmware 716 may implement some or all of the methods described above. Specifically, the firmware 716 may implement the methods described in the foregoing figures.

Figure 8:
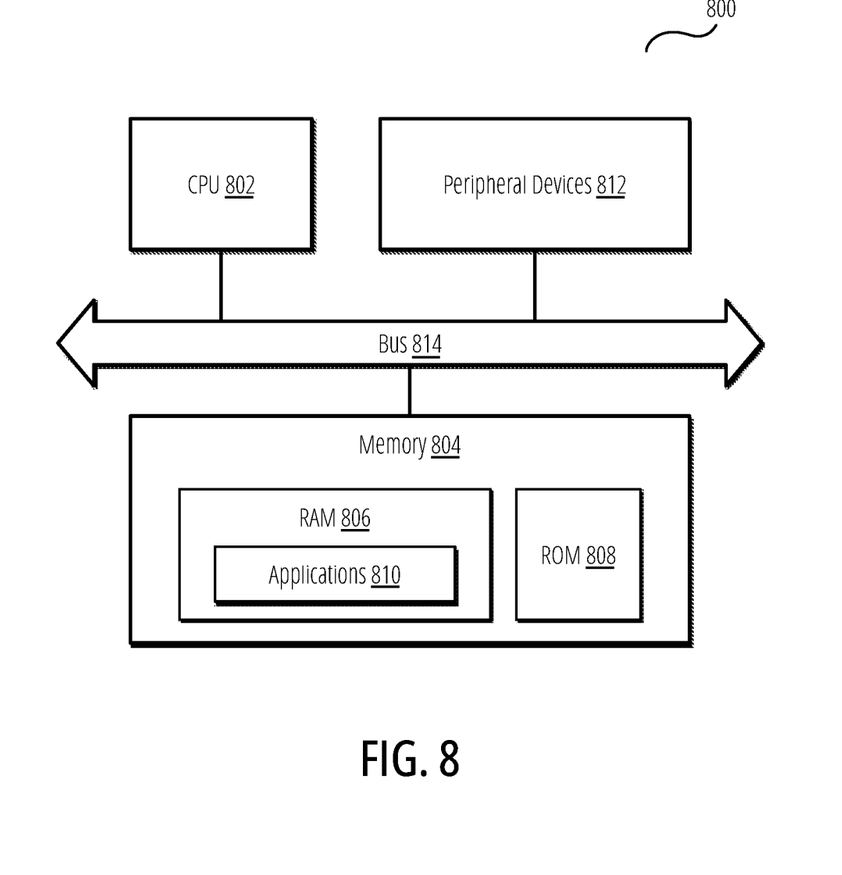
FIG. 8 is a block diagram of a computing device 800 according to some embodiments of the disclosure.

FIG. 8 is a block diagram of a computing device 800 according to some embodiments of the disclosure.

As illustrated, the device includes a processor or central processing unit (CPU) such as CPU 802 in communication with a memory 804 via a bus 814. The device also includes one or more input/output (I/O) or peripheral devices 812. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 802 may comprise a general-purpose CPU. The CPU 802 may comprise a single-core or multiple-core CPU. The CPU 802 may comprise a system-on-a-chip (SoC) or a similar embedded system. In some embodiments, a graphics processing unit (GPU) may be used in place of, or in combination with, a CPU 802. Memory 804 may comprise a non-transitory memory system including a dynamic random-access memory (DRAM), static random-access memory (SRAM), Flash (e.g., NAND Flash), or combinations thereof. In one embodiment, the bus 814 may comprise a Peripheral Component Interconnect Express (PCIe) bus. In some embodiments, bus 814 may comprise multiple busses instead of a single bus.

Memory 804 illustrates an example of non-transitory computer storage media for the storage of information such as computer-readable instructions, data structures, program modules, or other data. Memory 804 can store a basic input/output system (BIOS) in read-only memory (ROM), such as ROM 808, for controlling the low-level operation of the device. The memory can also store an operating system in random-access memory (RAM) for controlling the operation of the device Applications 810 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 806 by CPU 802. CPU 802 may then read the software or data from RAM 806, process them, and store them in RAM 806 again.

The device may optionally communicate with a base station (not shown) or directly with another computing device. One or more network interfaces in peripheral devices 812 are sometimes referred to as a transceiver, transceiving device, or network interface card (NIC).

An audio interface in peripheral devices 812 produces and receives audio signals such as the sound of a human voice. For example, an audio interface may be coupled to a speaker and microphone (not shown) to enable telecommunication with others or generate an audio acknowledgment for some action. Displays in peripheral devices 812 may comprise liquid crystal display (LCD), gas plasma, light-emitting diode (LED), or any other type of display device used with a computing device. A display may also include a touchsensitive screen arranged to receive input from an object such as a stylus or a digit from a human hand.

A keypad in peripheral devices 812 may comprise any input device arranged to receive input from a user. An illuminator in peripheral devices 812 may provide a status indication or provide light. The device can also comprise an input/output interface in peripheral devices 812 for communication with external devices, using communication technologies, such as USB, infrared, Bluetooth™, or the like. A haptic interface in peripheral devices 812 provides tactile feedback to a user of the client device.

A GPS receiver in peripheral devices 812 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 8, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A system comprising:
a key management server (KMS), the KMS configured to generate a first unique device secret (UDS) based in part on a server private key stored by the KMS; and
a secure device, comprising a hardware processor, the secure device configured to:
generate a second UDS based in part on a device private key stored by the secure device, the second UDS equal to the first UDS;
receive a trusted computing base (TCB);
compute a TCB component identifier (TCI) based on the TCB;
generate a first cryptographic key using the TCI and the second UDS;
generate a first digital certificate, the first digital certificate including the first cryptographic key;
transmit the first digital certificate to the KMS, wherein the KMS validates the first digital certificate based on a second cryptographic key generated using the first UDS;
receive a second digital certificate from the KMS after the KMS validates the first digital certificate, the second digital certificate signed using a second server private key; and
store the second digital certificate as a device certificate.

2. The system of claim 1, wherein the KMS is configured to generate the first UDS using the server private key and a device public key received from the secure device.

3. The system of claim 2, wherein the secure device is configured to generate the second UDS using the device private key and a server public key received from the KMS.

4. The system of claim 3, wherein the KMS and secure device exchange keys using a Diffie-Hellman key exchange.

5. The system of claim 1, wherein the KMS is further configured to:
computing a component device identifier (CDI) using the first UDS and a stored TCI; and
generating a second cryptographic key using the CDI, the second cryptographic key equal to the first cryptographic key.

6. The system of claim 5, wherein validating the first digital certificate comprises determining if the first cryptographic key in the first digital certificate is equal to the second cryptographic key.

7. The system of claim 1, wherein generating a first digital certificate comprises inserting a Device Identity Composition Engine (DICE) layer identifier and a unique identifier (UID) in a Common Name (CN) field of the first digital certificate.

8. The system of claim 1, wherein the KMS is further configured to revoke an existing digital certificate associated with the secure device upon validating the first digital certificate.

9. The system of claim 1, wherein the TCB is associated with a firmware image.

10. The system of claim 9, wherein the first cryptographic key comprises a device key of the secure device.

11. A method comprising:
storing, by a secure device, a device private key;
generating, by the secure device, a first unique device secret (UDS) based in part on the device private key;
receiving, by the secure device, a trusted computing base (TCB);
computing, by the secure device, a TCB component identifier (TCI) based on the TCB;
generating, by the secure device, a first cryptographic key using the TCI and the first UDS;
generating, by the secure device, a first digital certificate, the first digital certificate including the first cryptographic key;
transmitting, by the secure device, the first digital certificate to a key management server (KMS), wherein the KMS validates the first digital certificate based on a second cryptographic key generated using a second UDS stored by the KMS;
receiving, by the secure device, a second digital certificate from the KMS after the KMS validates the first digital certificate, the second digital certificate signed using a second server private key stored by the KMS; and
storing, by the secure device, the second digital certificate as a device certificate.

12. The method of claim 11, further comprising:
transmitting, by the secure device, a device public key to the KMS; and
generating, by the KMS, the second UDS using the server private key and the device public key.

13. The method of claim 12, further comprising generating, by the secure device, the firsts UDS using the device private key and a server public key received from the KMS.

14. The method of claim 13, further comprising exchanging keys between the secure device and the KMS using a Diffie-Hellman key exchange.

15. The method of claim 11, further comprising:
computing, by the KMS, a component device identifier (CDI) using the second UDS and a stored TCI; and
generating, by the KMS, a second cryptographic key using the CDI, the second cryptographic key equal to the first cryptographic key.

16. The method of claim 15, wherein validating the first digital certificate comprises determining if the first cryptographic key in the first digital certificate is equal to the second cryptographic key.

17. The method of claim 11, wherein the KMS is further configured to revoke an existing digital certificate associated with the secure device upon validating the first digital certificate.

18. The method of claim 11, wherein the TCB is associated with a firmware image.

19. The method of claim 18, wherein the first cryptographic key comprises a device key of the secure device.

20. The method of claim 11, wherein the TCB is associated with a firmware image generating a first digital certificate comprises inserting a Device Identity Composition Engine (DICE) layer identifier and a unique identifier (UID) in a Common Name (CN) field of the first digital certificate.

* * * * *